United States Patent [19]

Wyatt

[11] Patent Number: 5,524,909
[45] Date of Patent: Jun. 11, 1996

[54] REVERSED COLLET

[75] Inventor: Anthony P. Wyatt, Banbury, United Kingdom

[73] Assignee: Crawford Collets Limited, Witney, England

[21] Appl. No.: 257,923

[22] Filed: Jun. 9, 1994

[30]  Foreign Application Priority Data

Jun. 28, 1993 [GB]  United Kingdom ............... 9313284

[51] Int. Cl.⁶ .................................................... B23B 31/20
[52] U.S. Cl. ........................... 279/50; 279/4.09; 279/157
[58] Field of Search ................................ 279/4.07, 4.09, 279/47, 48, 50, 46.9, 43, 51, 57, 146, 157

[56]  References Cited

U.S. PATENT DOCUMENTS

| | | | |
|---|---|---|---|
| 628,730 | 7/1899 | Whitney et al. ........................ | 279/51 |
| 2,415,482 | 2/1947 | Greenough ............................. | 279/50 |
| 3,841,645 | 10/1974 | Parsons ................................. | 279/43 |
| 4,171,820 | 10/1979 | Klancnik ................................ | 279/50 |
| 4,602,798 | 7/1986 | Wettstein .............................. | 279/48 |
| 4,690,415 | 9/1987 | Holdridge ............................. | 279/50 |
| 4,822,220 | 4/1989 | Danielsson et al. .................. | 409/233 |

*Primary Examiner*—Steven C. Bishop
*Attorney, Agent, or Firm*—Rankin, Hill, Lewis & Clark

[57]  ABSTRACT

A collet arrangement comprises a collet having a taper at its work-piece receiving segmented head. The collet is axially fixed relative to a chuck body by means of a screwed bush. The latter is locked axially to the chuck body by being trapped under the heads of bolts, and is locked against rotation by means of a pin. The chuck body is secured to the machine spindle. A tapered sleeve is slidable between the chuck body and the collet and is secured to a draw tube by bolts, an actuating plate and an adaptor ring. These bolts freely slide through the chuck body and can thus move the tapered sleeve in an axial direction relative to the collet so that their respective tapers cause the collet segments to grip and release the work piece. Unlike the normal draw back type of collet arrangement, the collet itself is therefore axially fixed.

21 Claims, 7 Drawing Sheets

REVERSED COLLET

BACKGROUND OF THE INVENTION

The invention relates to collet arrangements.

A common type of collet arrangement uses the so-called drawback collet. This collet has collet segments which together define an aperture for receiving the work piece and provide a tapered external surface. The collet is threadedly attached to a draw bar or draw tube which draws the collet axially and rearwardly into a closing taper, that is, a tapered tube in which the collet is a sliding fit. Engagement between the outer tapered surfaces of the collet segments and the corresponding inner taper of the tube results in inward radial movement of the collet segments so as to grip the workpiece.

Although the drawback type of collet provides good accuracy consistent with axial concentricity, it has certain disadvantages resulting from the movement of the collet which is necessary to grip the workpiece. For example, this type of collet is not easy to use where a second operation has to be carried out on a workpiece, because it is difficult to achieve the required accuracy in the length of the workpiece and in its axial displacement relative to the front face of the collet. The drawback type of collet is also difficult to use where partially finished components have to be picked off from a main spindle to a sub-spindle for subsequent machining; it is difficult to obtain the necessary strict control of axial position of such partially finished components, especially when they are extremely short. It is also difficult or impossible to use a fixed back stop with this type of collet.

BRIEF SUMMARY OF THE INVENTION

According to the invention, there is provided a collet arrangement of the draw back type but in which the collet is fixed axially with respect to the machine spindle and in which the draw bar or draw tube is connected instead to a tapered sleeve having an internally tapered surface portion which is mounted to slide axially over the externally tapered surface portion of the axially fixed collet for gripping and releasing a work-piece in the collet.

According to the invention, there is also provided a collet arrangement, comprising a collet with a segmented workpiece receiving head which has an externally tapered surface portion, a sleeve juxtaposed around the said surface collet and having an internal tapered surface portion, mounting means for mounting the collet in a position axially fixed in relation to a machine spindle, and actuating means for moving the sleeve axially relative to the collet and the spindle whereby the cooperating tapered surface portions act together to clamp or release a work-piece received in the collet.

DESCRIPTION OF DRAWINGS

A collet arrangement embodying the invention will now be described, by way of example only, with reference to the accompanying diagrammatic drawings in which.

DESCRIPTION OF PREFERRED EMBODIMENTS

Figure 1:
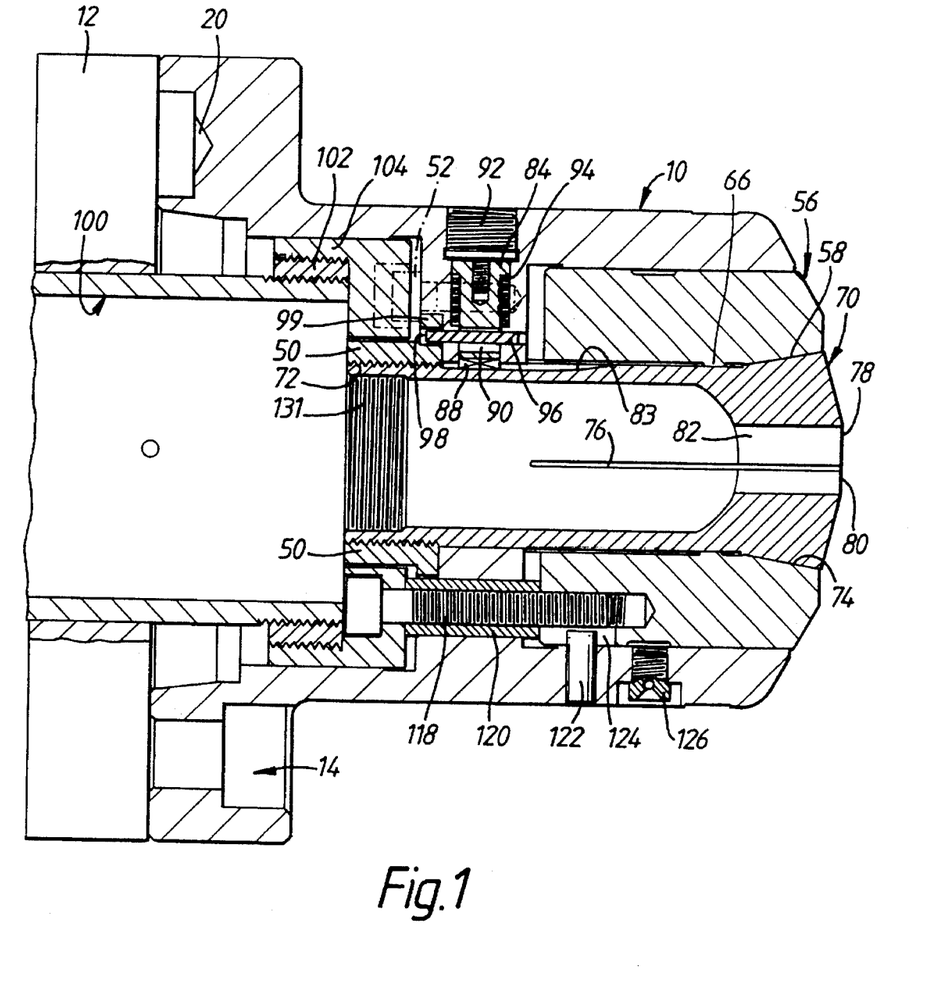
FIG. 1 is a cross-section through the collet arrangement on the line I—I of FIG. 2.
Figure 2:
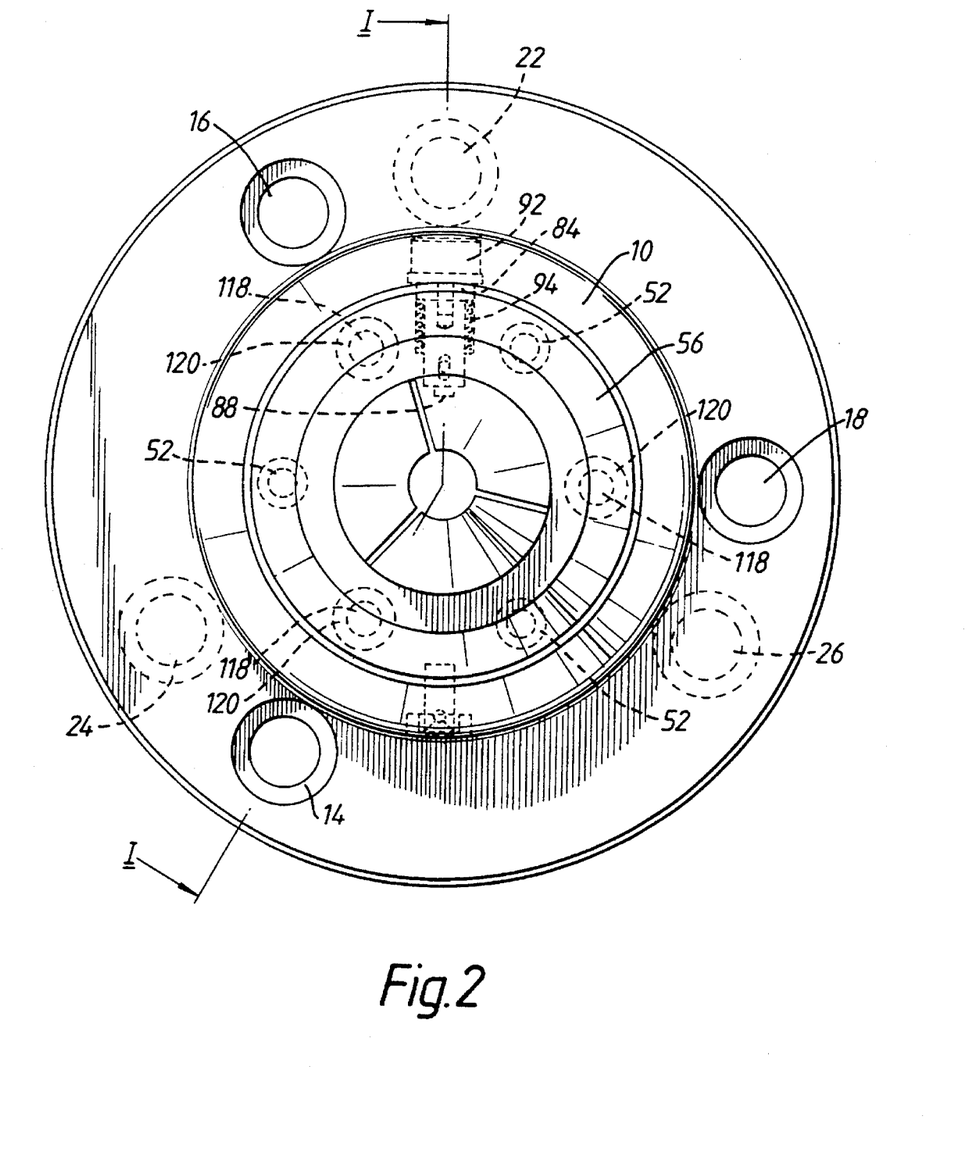
FIG. 2 is an end view of the collet arrangement of FIG. 1 but with the actual collet omitted.
Figure 3:
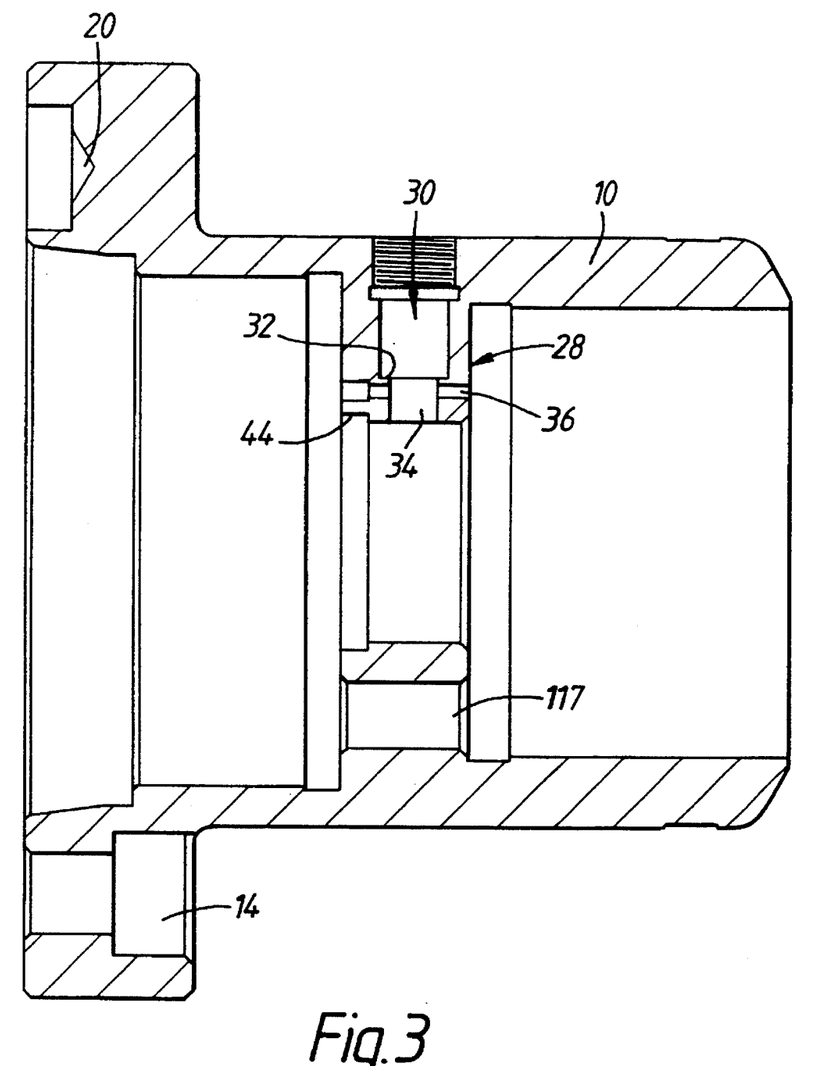
FIG. 3 is a cross-section through a chuck body of the collet arrangement of FIG. 1 and is a section on the line III—III of FIG. 4.

Referring to FIG. 1, the collet arrangement has a chuck body 10 which is secured to the machine spindle 12 by means of suitable bolts (not shown) passing through holes 14,16 and 18 (see FIGS. 2 and 3) and which may also be located by means of locating pins such as shown at 20 and which locate in recesses 22,24 and 26 (see also FIGS. 2 and 3).

As shown most clearly in FIG. 3, the chuck body 10 has an internal annular flange 28. In one circumferential position of the chuck body, a radially-directed through bore 30 is provided, extending completely through the flange 28 and with a shoulder 32. The narrowed part 34 of the bore 30 is intersected by an axially extending narrow bore 36.

A recess 44 is machined in one face of the flange 28.

Figure 4:
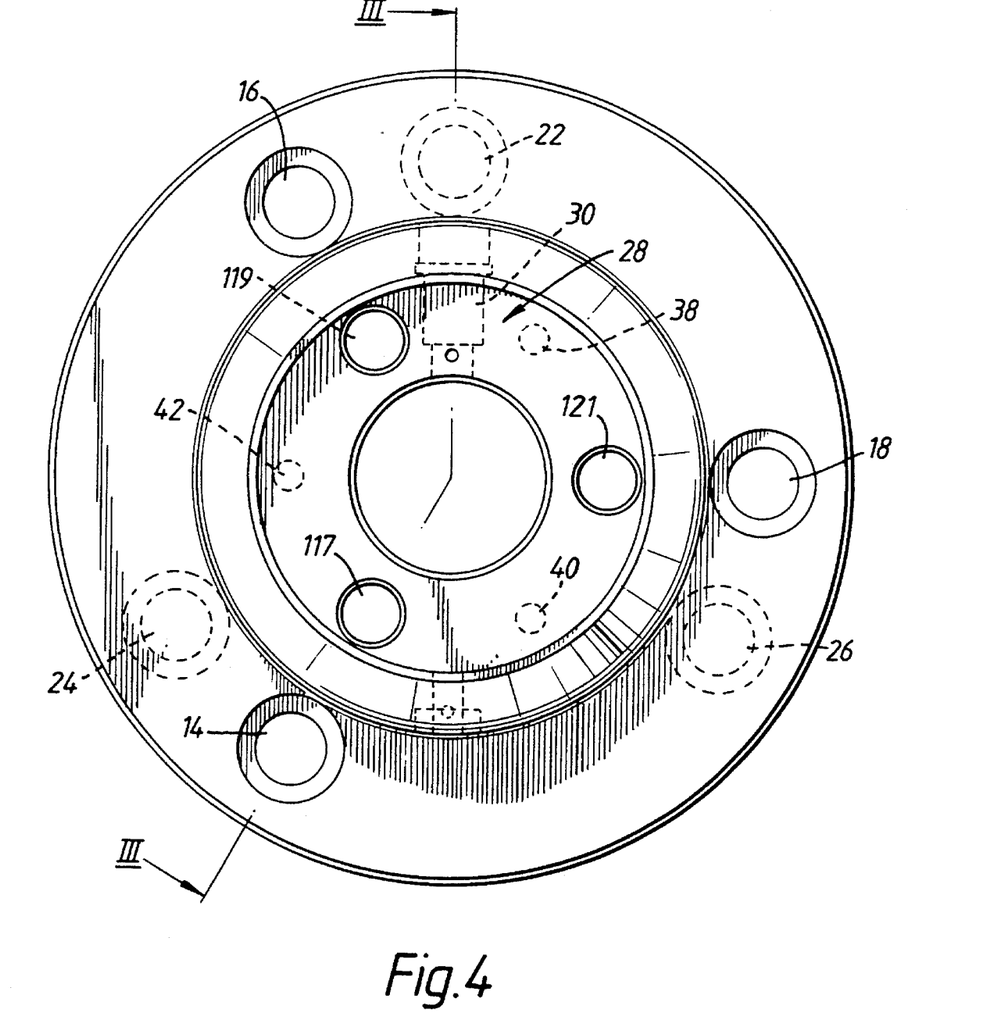
FIG. 4 is an end view of the chuck body of FIG. 3.

Referring to FIG. 1, an internally threaded bush 50 is fitted in the recess 44 (FIG. 3) and is accurately retained axially in the recess by engaging with the underside of the heads of three bolts 52 (only one shown, see FIG. 1) which respectively engage in threaded bores 38,40 and 42 in the flange 28 of the chuck body (FIGS. 2 and 4). The diametral fit between the bush 50 and the recess 44 of the chuck body 10 provides a deliberate clearance in order to obtain radial float.

Figure 7:
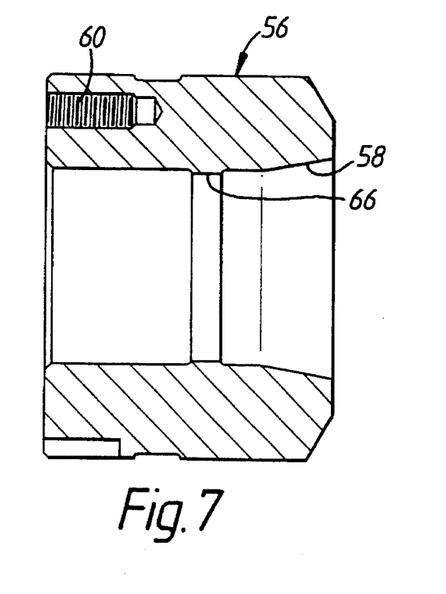
FIG. 7 is a cross-section of tapered sleeve used in the collet arrangement and taken on the line VII—VII of FIG. 8.
Figure 8:
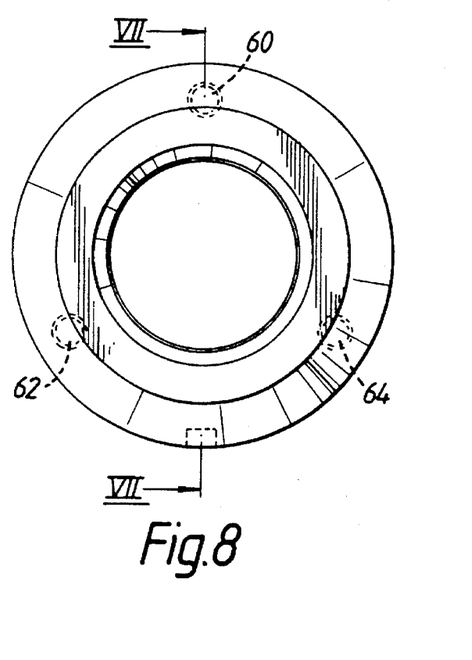
FIG. 8 is an end view of the sleeve of FIG. 7.

A front sleeve 56 having a front end tapered at 58 is a sliding fit within the chuck body 10. The sleeve 56 is shown in FIGS. 7 and 8. Its rear face is provided with three threaded bores 60,62 and 64. Its inside surface is provided with an annular shoulder 66 for a purpose to be described.

FIG. 1 shows the collet 70 which has an external accurately machined thread 72 at its rear or tail end and a taper 74 at its head. It is machined with three axially extending slots (one shown at 76) in the conventional way to define three collet segments (two shown at 78 and 80) and a workpiece-receiving aperture 82. It also has an axially extending key way 83. Its thread 72 engages the internal thread of the bush 50.

Figure 5:
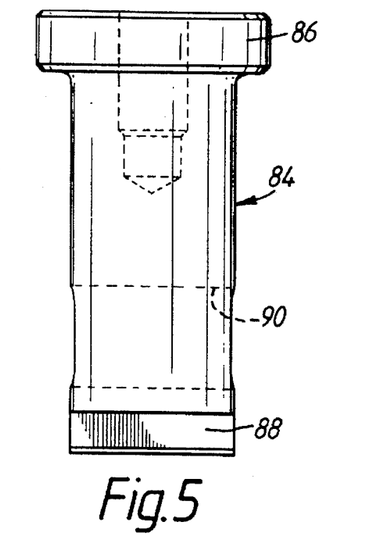
FIG. 5 is a side elevation, to an enlarged scale, of a key used in the chuck body.
Figure 6:
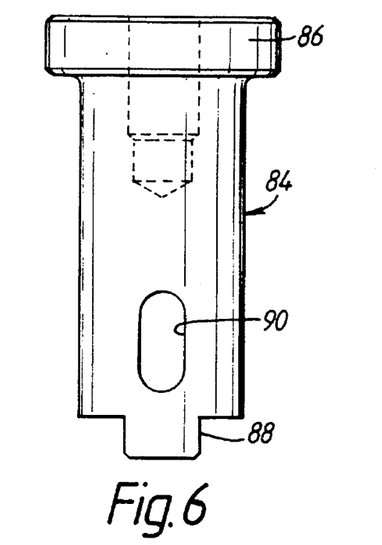
FIG. 6 is a side view of the key of FIG. 5 but turned through 90° about a vertical axis.

When the collet 70 is in position, a key 84 (see also FIGS. 5 and 6) having a head 86 is placed in the bore 30 (FIG. 3). As shown in FIGS. 5 and 6, the key 84 has a rectangular foot 88 and a through slot 90. The key is held in position in the bore 30 by means of a set screw 92 which forces the key 84 into the bore 30 against the force of a compression spring 94, until the rectangular end 88 of the key engages in the keyway 82 to prevent rotation of the collet 70. The axial length of the key 84 is arranged to be such that the set screw 92 cannot over-insert the rectangular foot 88 into the keyway 82. When the key is in the correct position, a pin 96 (FIG. 1) can be inserted through the bore 36 (FIG. 3) and the slot 90 in the key so as to enter a bore 98 in a flange 99 forming part of the bush 50 and thereby prevent rotation of the bush. The radial float permitted to the bush 50 tolerates any concentricity errors in the thread of the collet.

The collet 70 may be screwed into the bush 50 by means of a special tool (not shown) which has three projections positioned to engage the three segments (e.g. 76, FIG. 1) of the head of the collet.

Figure 9:
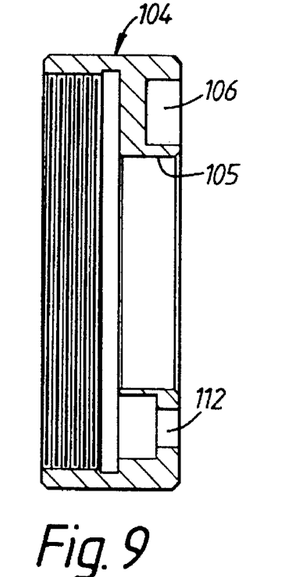
FIG. 9 is a cross-section of a rear actuating plate used in the collet arrangement and taken on the line IX—IX of FIG. 10.
Figure 10:
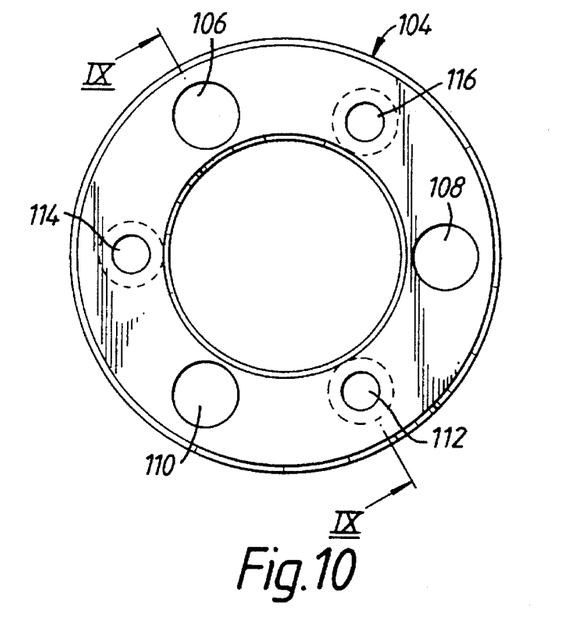
FIG. 10 is an end view of the rear actuating plate of FIG. 9.

FIG. 1 shows the machine tool's normal draw bar 100. This carries an external thread on which is screwed an adaptor ring 102 which is in turn threadedly attached to a rear actuating plate 104 (see FIGS. 9 and 10). As shown in FIGS. 9 and 10, the rear actuating plate 104 is provided with three recesses 106,108 and 110 in a flange 105 for receiving the heads of the three bolts 52 (FIG. 1). In addition, it is provided with three holes 112,114 and 116 extending through its flange 105. A bolt 118 extends through each of these holes 112,114 and 116, through corresponding holes 117,119 and 121 in the flange 28 of the chuck body 10, see FIGS. 3 and 4 and threadedly engages a corresponding one of the bores 60,62 and 64 in the front sleeve 56 (see also FIGS. 7 and 8). One such bolt 118 is shown in FIG. 1, the others not being visible. Each of these three bolts 118 passes through a respective spacing sleeve 120 of which only one is visible, see FIG. 1.

As shown in FIG. 1, a pin 122 is a press fit in the chuck body 10 and cooperates with a longitudinal slot 124 (see FIG. 7) in the front sleeve 56 to prevent relative rotational movement.

A grease nipple 126 (FIG. 1) is provided for lubrication between the chuck body 10 and the front sleeve 56.

It will be apparent from the foregoing description that the arrangement described locks the collet 70 in an accurate and fixed axial position relative to the chuck body 10 and thus to the machine spindle 12. Through the intermediary of the rear actuating plate 104 and the three bolts 118, however, the draw bar tube 100 is connected to the front sleeve 56. The draw bar tube 100 can be moved in an axial direction such as hydraulically or by any other suitable mechanism. When the tube 100 moves to the right (as shown in FIG. 1), therefore, the motion is transmitted by the bolts 118 to the front sleeve 56 which thus moves to the right relative to the axially locked collet 70. Relative movement between the taper 58 (of the front sleeve 56) and the taper 74 (of the collet 70) therefore takes place. This causes radially inward movement of the segments of the head of the collet 70 so as to grip a workpiece positioned within the aperture 82. The bolts 118 move freely through the sleeves 120. Movement of the drawbar tube 100 to the left releases the workpiece.

The shoulder 66 (FIG. 7) engages the outside surface of the collet 70 to hold the collet concentrically.

It will therefore be seen that the arrangement described reverses the normal arrangement of a drawback-type collet. In the arrangement described, the collet remains axially stationary and it is the front sleeve 56 which moves axially to cause the collet segments to grip and release the workpiece. This means that the axial position of the collet 70 is accurately known and fixed and this enables the axial position of the workpiece to be similarly accurately controlled. The axial position of the workpiece relative to the front end of the collet is thus accurately known, thus facilitating accurate second operation machining of components gripped in the collet. Picking off partially finished components to a sub-spindle for subsequent machining is thus also facilitated because the axial position of such components is accurately known. This is especially advantageous for extremely short components.

In collets of the draw back type, axial movement of the collet to clamp the workpiece will also result in slight axial movement of the workpiece itself (during the clamping process). If the workpiece is at the same time clamped in another collet (such as during a picking off operation), the result will be that tension will be applied to the machine lead screw. In extreme cases, damage to the machine can occur. This is avoided in the collet arrangement described because the collet does not move axially.

Figure 11:
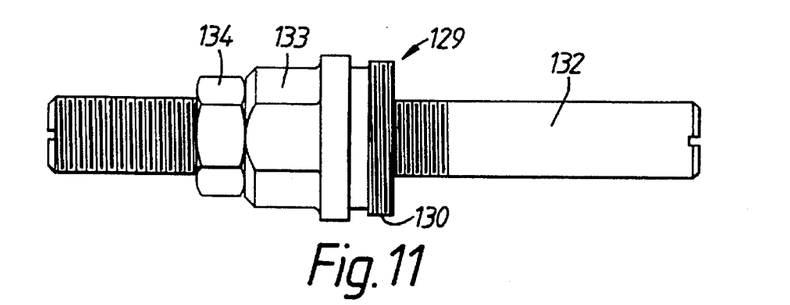
FIG. 11 is a side elevation of an adjustable stop for the collet arrangement.

Because the collet 70 remains axially stationery, an accurate back stop can be used. Such a back stop 129 is illustrated in FIG. 11. It is mounted in the tail end of the collet by threadedly engaging an external thread 130 with an internal thread 131 (see FIG. 1) in the collet. The stop provides a threaded pin 132 whose axial position can be adjusted by means of nuts 133 and 134. With the normal drawback-type of collet, a fixed backstop cannot be used to provide accurate axial location of the workpiece; it can only provide approximate location.

Figure 12:
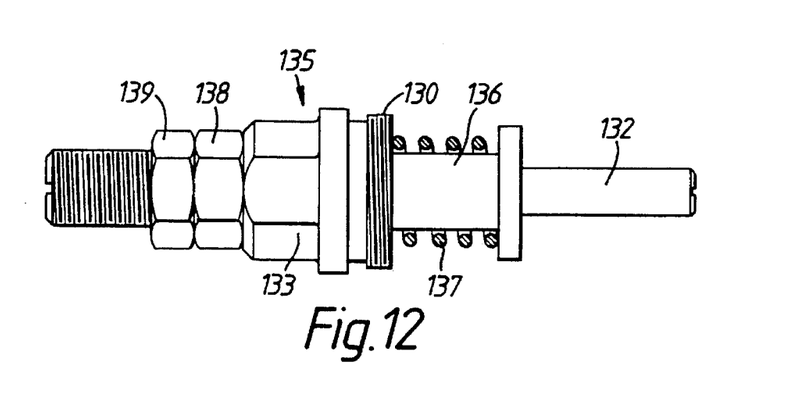
FIG. 12 is a side elevation of an ejector assembly for the collet arrangement.

The arrangement described also facilitates the use of an ejector assembly 135, as shown in FIG. 12. The ejector assembly is constructed generally similarly to the adjustable stop of FIG. 11. However, the pin 130 of the ejector assembly 135 is rigid with a flanged sleeve 136, the two parts being freely slidable in an axial direction within a bore in nut 133 against the force of a compression spring 137. The assembly 135 is mounted in the tail end of the collet 70 by means of the external thread 130 in the same way as for the back stop 129. The head of the pin 132 contacts the workpiece with the spring 137 partially compressed. Thus, when the collet releases the workpiece, the latter is ejected by resiling of the spring. The axial position of pin 132 can be adjusted by means of a nut 138 and a lock nut 139.

Figure 13:
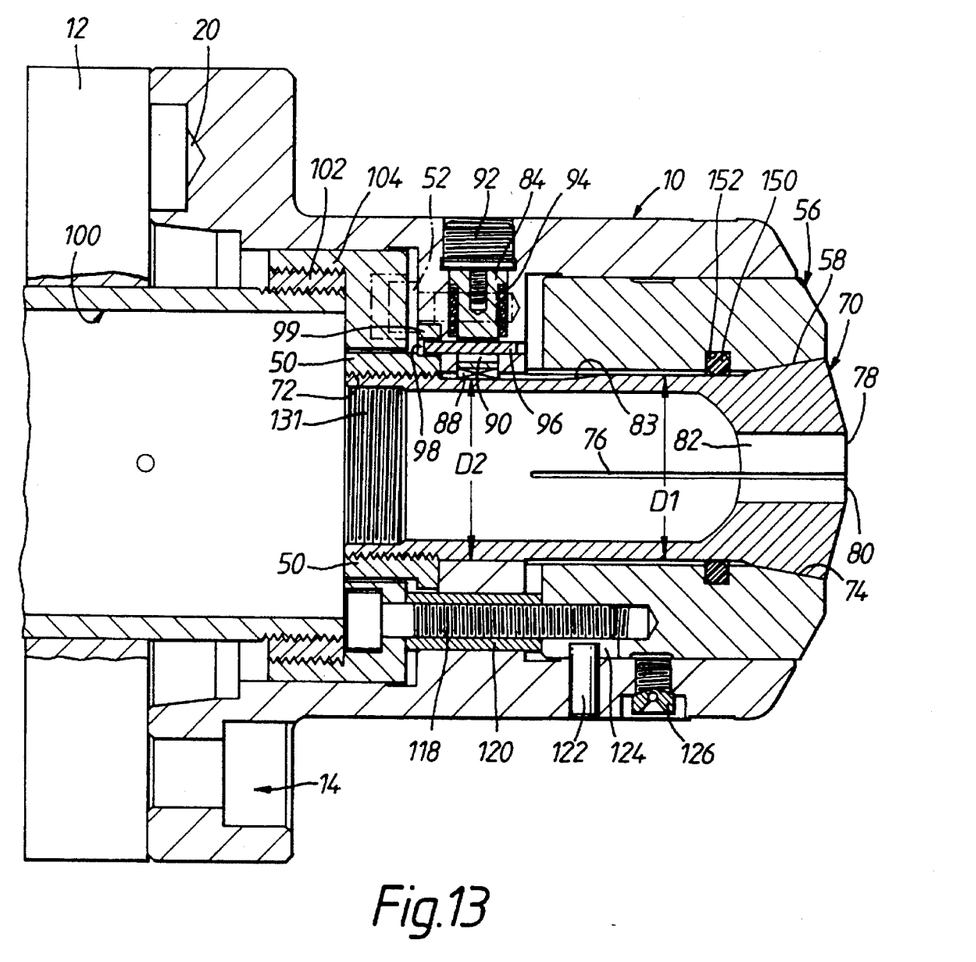
FIG. 13 is a view corresponding to FIG. 1 but showing a modification.

In a modification, shown in FIG. 13, the shoulder 66 (FIG. 7) is replaced with an elastomeric 'O' ring 150 which is housed in a concentric groove 152 in the tapered sleeve 56. In such an arrangement, the collet 70 has a slightly reduced barrel diameter D1. The 'O'ring compresses to allow the collet's back fitting diameter D2 to pass through. Subsequent resiling of the 'O' ring enables it to act as a support in contact with the barrel of the collet.

What is claimed is:

1. A collet arrangement of the draw-back type for mounting a collet with an externally tapered surface portion to a machine spindle, comprising means for fixing the collet axially with respect to the machine spindle, a tapered sleeve having an internally tapered surface portion and which is mounted to slide axially over the externally tapered surface portion of the collet so that the collet grips and releases a work-piece, draw means for controlling the gripping and releasing of the work-piece by the collet, means connecting the draw means to move the tapered sleeve axially, a hollow chuck body fast with the machine spindle, and securing means axially securing the collet in the hollow chuck body so that the hollow chuck body embraces the outside of the collet, the hollow chuck body being connected to the collet so that the collet and the chuck body rotate together with the machine spindle but cannot move axially relative to each other, the securing means including means accommodating a predetermined amount of concentricity error between the collet and the chuck body.

2. An arrangement according to claim 1, in which the chuck body defines an internal cylindrical surface matching an external surface of the tapered sleeve, the tapered sleeve being slidably positioned between and in contact with the internal cylindrical surface of the chuck body and the external surface of the collet including the latter's tapered surface portion.

3. A collet according to claim 1, including means securing the draw means to the sleeve for causing the said relative movement of the sleeve and the collet.

4. A collet arrangement, comprising a collet with a segmented work-piece receiving head which has an externally tapered surface portion, the collet having a tail end axially spaced from the work-piece receiving head, a sleeve juxtaposed around the said tapered surface portion of the collet and having an internal tapered surface portion, a chuck body of generally hollow cylindrical form and adapted to be axially and rotatably fixed to a machine spindle, securing means for securing the collet fast to and within the chuck body in a predetermined axial position thereby mounting the collet in a position axially fixed in relation to the machine spindle, the sleeve being slidably mounted with respect to both the chuck body and the collet, and actuating means for moving the sleeve axially relative to the collet and the spindle whereby the cooperating tapered surface portions act together to clamp or release a work-piece received in the collet, the securing means comprising attaching means accommodating a predetermined amount of concentricity error between the collet and the chuck body.

5. An arrangement according to claim 4, in which the securing means comprises an annular flange within and forming part of the chuck body and for surrounding and receiving the collet, and a threaded bush externally surrounding and threadedly attached to the tail end of the collet, the attaching means attaching the bush to the annular flange of the chuck body in a manner preventing axial movement of the bush relative to the flange and preventing rotational movement of the bush relative to the flange but permitting a predetermined amount of radial float of the bush relative to the flange and thereby accommodating said predetermined amount of concentricity error between the collet and the chuck body.

6. An arrangement according to claim 5, in which the flange has an annular recess for receiving the bush, and the attaching means comprises at least one bolt threadedly engaged in a threaded hole positioned in the flange adjacent the recess and extending parallel to the axial direction, the bolt having an enlarged head which overlaps the bush and the recess and holds the bush in the recess.

7. An arrangement according to claim 6, in which the attaching means includes a pin extending in an axial direction through the flange of the chuck body and into a bore in the bush to prevent relative rotation of the bush and the chuck body.

8. An arrangement according to claim 5, in which the securing means includes a key extending radially through the flange in the chuck body and engaging in a keyway within the external surface of the collet to prevent rotation of the latter relative to the chuck body.

9. An arrangement according to claim 4, in which the sleeve is axially slidably mounted between the interior surface of the chuck body and the exterior surface of the collet.

10. An arrangement according to claim 9, in which the chuck body has an axial extension which extends away from the annular flange of the chuck body towards the head of the collet, the sleeve being positioned within this axial extension, and in which the actuating means comprises linking means extending through the annular flange into attachment with the sleeve whereby the said axial sliding movement of the sleeve is produced by a force acting through the annular flange.

11. An arrangement according to claim 10, in which the force is produced by means of a draw bar or draw tube connected to the linking means.

12. An arrangement according to claim 11, in which the linking means comprises a plurality of members attached to the sleeve and slidably extending through the annular flange and attached to the draw bar or draw tube.

13. An arrangement according to claim 10, in which each of the linking means comprises a respective bolt.

14. An arrangement according to claim 4, in which the inner surface of the sleeve defines a ridge adjacent to its tapered surface portion and for engaging the external surface of the collet adjacent but spaced from the latter's tapered surface portion, the ridge maintaining the concentricity of the collet in the sleeve.

15. An arrangement according to claim 4, including means supporting resilient means mounted in contact with the inner surface of the sleeve adjacent its tapered surface portion and engaging the external surface of the collet adjacent but spaced from the latter's tapered surface portion, the resilient means maintaining the concentricity of the collet in the sleeve.

16. An arrangement according to claim 15, in which the resilient means comprises resilient sealing means sealingly engaging the said external surface of the collet adjacent but spaced from the latter's tapered surface portion.

17. An arrangement according to claim 5, in which the key has a rectangular cross-section.

18. A collet arrangement, comprising a collet with a segmented work-piece receiving head which has an externally tapered surface portion, a sleeve juxtaposed around the said tapered surface portion of the collet and having an internal tapered surface portion, mounting means for mounting the collet in a position axially fixed in relation to a machine spindle, and actuating means for moving the sleeve axially relative to the collet and the spindle whereby the cooperating tapered surface portions act together to clamp or release a work-piece received in the collet;

the mounting means comprising a chuck body of generally hollow cylindrical form and adapted to be axially and rotatably fixed to the machine spindle, and securing means for securing the collet fast to and within the chuck body in a predetermined axial position, the sleeve being slidably mounted with respect to both the chuck body and the collet;

the securing means comprising an annular flange within and forming part of the chuck body and for surrounding and receiving the collet, a threaded bush externally surrounding and threadedly attached to the tail end of the collet, and attaching means for attaching the bush to the annular flange of the chuck body in a manner preventing axial movement of the bush relative to the flange and preventing rotational movement of the bush relative to the flange but permitting a predetermined amount of radial float of the bush relative to the flange.

19. An arrangement according to claim 18, in which the flange has an annular recess for receiving the bush, and the attaching means comprises at least one bolt threadedly engaged in a threaded hole positioned in the flange adjacent the recess and extending parallel to the axial direction, the bolt having an enlarged head which overlaps the bush and the recess and holds the bush in the recess.

20. An arrangement according to claim 19, in which the attaching means includes a pin extending in an axial direction through the flange of the chuck body and into a bore in the bush to prevent relative rotation of the bush and the chuck body.

21. A collet arrangement, comprising a collet with a segmented work-piece receiving head which has an externally tapered surface portion, a sleeve juxtaposed around the said tapered surface portion of the collet and having an internal tapered surface portion, mounting means for mounting the collet in a position axially fixed in relation to a machine spindle, actuating means for moving the sleeve axially relative to the collet and the spindle whereby the cooperating tapered surface portions act together to clamp or release a work-piece received in the collet, and resilient sealing means mounted in contact with the inner surface of the sleeve adjacent its tapered surface portion and sealingly engaging the external surface of the collet adjacent but spaced from the latter's tapered surface portion, the sealing means maintaining the concentricity of the collet in the sleeve.

* * * * *